Figure 1:
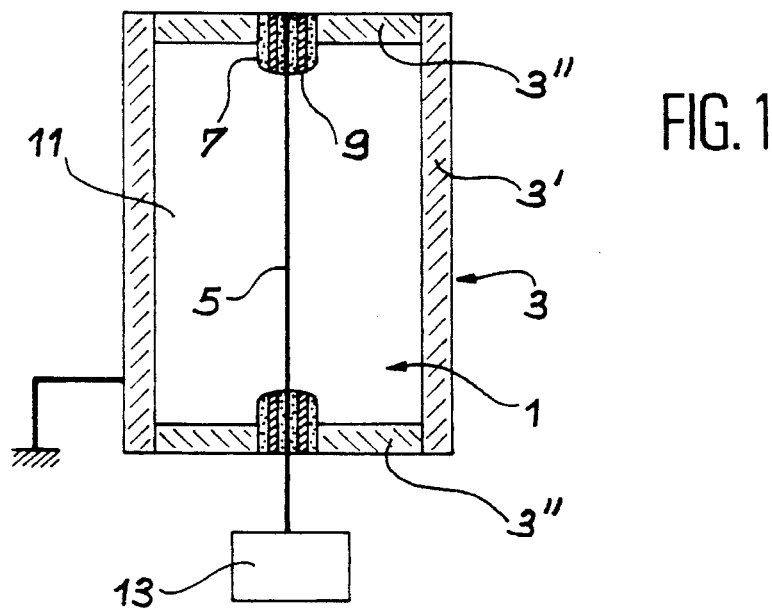

United States Patent [19]
Barthe et al.

[11] Patent Number: 5,569,699
[45] Date of Patent: Oct. 29, 1996

[54] BIOLOGICAL TISSUE-EQUIVALENT POLYMER COMPOSITION HAVING A VERY HIGH RESISTIVITY

[75] Inventors: Jean Barthe, Massy; Jean-Marc Bordy, St. Michelson Orge, both of France

[73] Assignee: Commissariat a l'Energie Atomique, Paris, France

[21] Appl. No.: 424,542

[22] PCT Filed: Sep. 29, 1994

[86] PCT No.: PCT/FR94/01140

§ 371 Date: Jun. 1, 1995

§ 102(e) Date: Jun. 1, 1995

[87] PCT Pub. No.: WO95/09889

PCT Pub. Date: Apr. 13, 1995

[30] Foreign Application Priority Data

Oct. 1, 1993 [FR] France .................................. 93-11711

[51] Int. Cl.$^6$ ...................................................... C08K 3/00
[52] U.S. Cl. ................... 524/496; 250/336.1; 250/472.1; 524/495
[58] Field of Search ............................... 250/336.1, 472.1; 524/495, 496

*Primary Examiner*—Edward J. Cain
*Attorney, Agent, or Firm*—Oblon, Spivak, McClelland, Maier & Neustadt, P.C.

[57] ABSTRACT

The present invention relates to a polymer composition equivalent to the biological tissue and having a very high resistivity. The invention also relates to the use of this composition in the production of the cathode (3") of a proportional counter equivalent to the biological tissue, as well as to a counter incorporating such a cathode.

This composition is characterized in that it is formed from a polyamide, polypropylene, epolene and carbon black and in that it has a mass atomic composition such that the hydrogen is between approximately 6 and 14%, the carbon between approximately 55.5 and 86.5%, the nitrogen between approximately 2.5 and 4.5%, the oxygen between approximately 1.5 and 7.5%, the calcium between approximately 1.5 and 9.5% and the fluorine between approximately 1 and 9%, the sum of the carbon, oxygen and fluorine quantities in the total composition being between approximately 72 and 90%.

11 Claims, 3 Drawing Sheets

BIOLOGICAL TISSUE-EQUIVALENT POLYMER COMPOSITION HAVING A VERY HIGH RESISTIVITY

The present invention relates to a polymer composition, equivalent to the biological tissue and having a very high resistivity. The invention also relates to the use of this polymer composition in the production of the cathode of a proportional counter equivalent to the biological tissue, as well as proportional counters equivalent to the biological tissue incorporating a cathode made with the aid of the aforementioned polymer composition.

Any person working in a nuclear power station or in the vicinity of a radioactive source must permanently carry a dosimeter or a radioactivity measurement counter. These apparatuses make it possible on the one hand to establish whether or not said person has been exposed to radiation and on the other to quantify the absorbed dose and the dose equivalent. These counters are of two types, the first or "passive" type only making it possible to record the radiation quantity received, but requiring a subsequent development treatment in order to obtain results and the second or "active" type combined with a display makes it possible to obtain the absorbed radiation dose in real time.

Among the active counters, there are biological tissue-equivalent proportional counters, i.e. counters intended to simulate a biological tissue volume of a few micrometers. The term biological tissue has a number of meanings and here refers exclusively to the biological tissue reproducing human striated muscles. In general terms, this type of counter comprises an enclosure defined by a sheath forming a cathode. This sheath is made from a biological tissue-equivalent material. The enclosure is filled with a gaseous mixture, which must have biological tissue-equivalent properties, so that the interactions taking place in said counter are identical to those occurring in the human tissue. Finally, an anode is provided in the centre of said enclosure. This anode is connected to means for amplifying the electrical signal supplied by said anode.

In order that a material is equivalent to the biological tissue, it is necessary for its composition to be as close as possible to that of the biological tissue standard defined by the ICRU (International Commission on Radiation Units and Measurements), 1964.

The theoretical mass atomic composition of a biological tissue-equivalent material is as follows:

| hydrogen: | 10.20% | magnesium: | 0.02% |
|---|---|---|---|
| carbon: | 12.30% | phosphorus: | 0.20% |
| nitrogen: | 3.50% | sulphur: | 0.50% |
| oxygen: | 72.90% | potassium: | 0.30% |
| sodium: | 0.08% | calcium: | 0.07%. |

Among these constituents, hydrogen and nitrogen are particularly important with respect to the interactions of neutrons with the biological tissue-equivalent material. Therefore priority is given to the respecting of their weights. The mean atomic number of the material obtained is also respected, so as to obtain a good equivalence to the biological tissue of the material during its interaction with photons. Thus, photons mainly interact with electrons. The interaction number is in an initial approximation proportional to the number of electrons contained in the material. The mean atomic number is calculated according to the formula $Z=(\Sigma_i n_i z_i)/(\Sigma_i n_i)$, $n_i$ representing the number of atoms of the constituent i per unit of mass and $z_i$ the atomic number of the constituent i. This mean atomic number corresponds to the average number of electrons "attached" to an atom. It is therefore an overall quantitative indicator of the interaction of the photons with the material.

The prior art also discloses a biological tissue-equivalent material used at present for producing certain components of biological tissue-equivalent proportional counters. This material is a conductive polymer known under the name A150 (registered trademark), developed by F. Shonka. It is in particular described in an article by James B. Smather and Victor A. Ohe, "Composition of A-150 tissue equivalent plastic", Medical Physics, vol. 4, No. 1, Jan.–Feb. 1977, Am. Assoc. Phys. Med. This material is formed from polyethylene (45.14% by weight), polyamide: nylon Zytel 69 of formula $C_{12}H_{22}O_2N_2$ (35.22% by weight), carbon black (16.06% by weight) and calcium fluoride $CaF_2$ (3.58% by weight). The production process for this material is also described in U.S. Pat. No. 3,005,794.

The mass atomic composition of A150 is as follows:
hydrogen: 10.10%
carbon: 77.60%
nitrogen: 3.50%
oxygen: 5.20%
calcium: 1.80%
fluorine: 1.80%.

This polymer material is conductive and consequently its resistivity is low, being approximately 30 to 70 Ohms•cm.

However, during the manufacture and development of biological tissue-equivalent proportional counters, it has proved useful to have a material which is not only equivalent to the biological tissue, but which also has a very high resistivity, so as to reduce the inhomogeneities of the electrical field in such counters. Such a material could be used in counters having a cylindrical, monocellular geometry or multicellular geometry, with a more complex structure, but which are necessary for the production of individual dosimeters.

Therefore the object of the invention is to develop a novel polymer composition having not only an equivalence to the biological tissue, but also a .very high resistivity.

This object is achieved with the aid of a polymer composition characterized in that it is formed from a polyamide, polypropylene, epolene, fillers and carbon black and in that it has a mass atomic composition such that the hydrogen is between approximately 6 and 14%, the carbon between approximately 55.5 and 86.5%, the nitrogen between approximately 2.5 and 4.5%, the oxygen between approximately 1.5 and 7.5%, the calcium between approximately 1.5 and 9.5% and the fluorine between approximately 1 and 9%, the sum of the quantities of carbon, oxygen and fluorine in the total atomic composition being between approximately 72 and 90%.

Such a polymer composition has a resistivity between 10M Ohms•cm and 40 G Ohms•cm.

The invention also relates to the use of this polymer composition in the production of at least part of the cathode of a biological tissue-equivalent proportional counter.

As a result of the resistivity characteristics of the polymer composition, it is possible to produce part of the cathode of a proportional counter and obtain within the latter a very homogeneous electrical field.

The invention also relates to a monocellular and preferably cylindrical, biological tissue-equivalent proportional counter comprising a sealed enclosure, defined by a cathode incorporating an elongated body and two bases sealing the two ends of said body, the enclosure being filled with a biological tissue-equivalent gas and being longitudinally traversed by an anode. According to the features of the invention, the two bases of the cathode are produced from the aforementioned polymer composition.

Finally, the invention relates to a multicellular, biological tissue-equivalent proportional counter comprising a sealed enclosure defined by a frame and at least two assemblies, each assembly being formed from a block positioned between two conductive plates, the plate directed towards the interior of said enclosure and the said block being perforated so as to define a plurality of cells issuing into the enclosure, said enclosure being filled with a biological tissue-equivalent gas and is traversed by at least one anode. According to the characteristics of the invention, the block is produced from the aforementioned polymer composition.

The invention is described in greater detail hereinafter relative to a non-limitative embodiment and with reference to the attached drawings, wherein show:

FIG. 1 a diagram illustrating in longitudinal section an embodiment of a cylindrical, monocellular, biological tissue-equivalent counter according to the invention.

Figure 2:
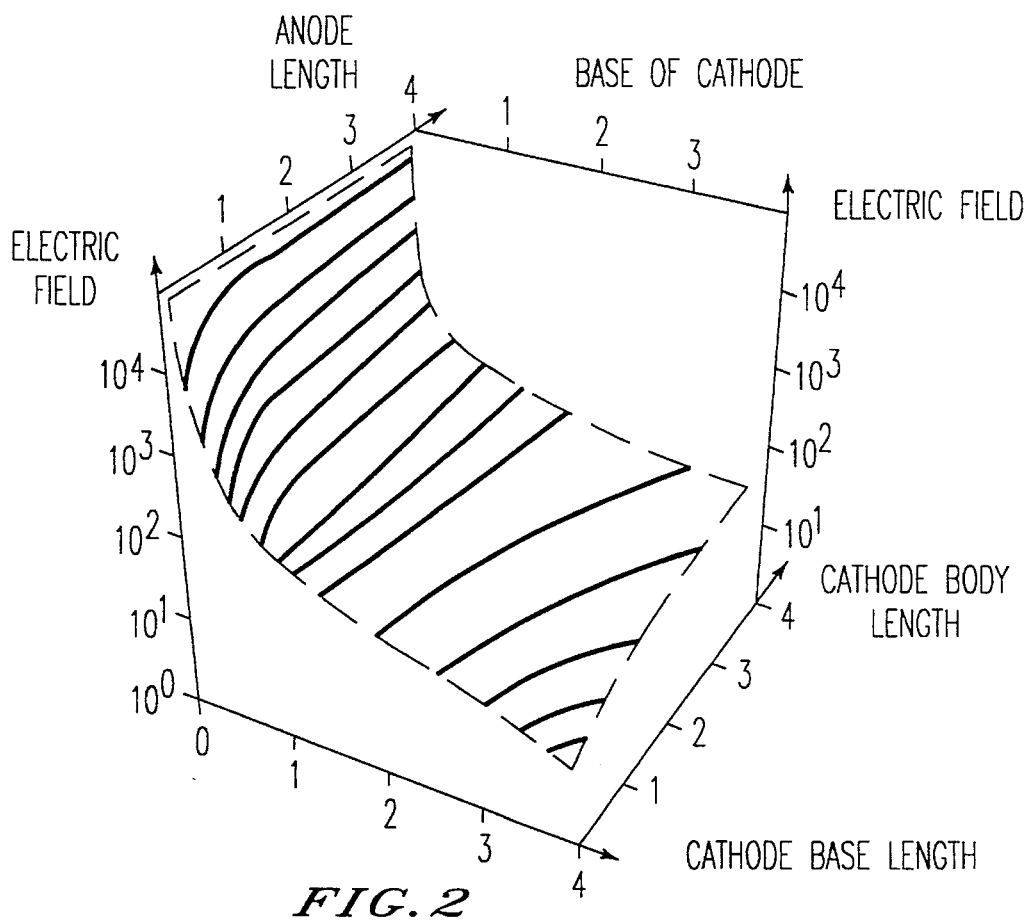

FIG. 2 a three-dimensional diagram illustrating the variation of the electrical field within a biological tissue-equivalent monocellular counter, whereof part of the cathode is formed from a prior art, conductive polymer material.

Figure 3:
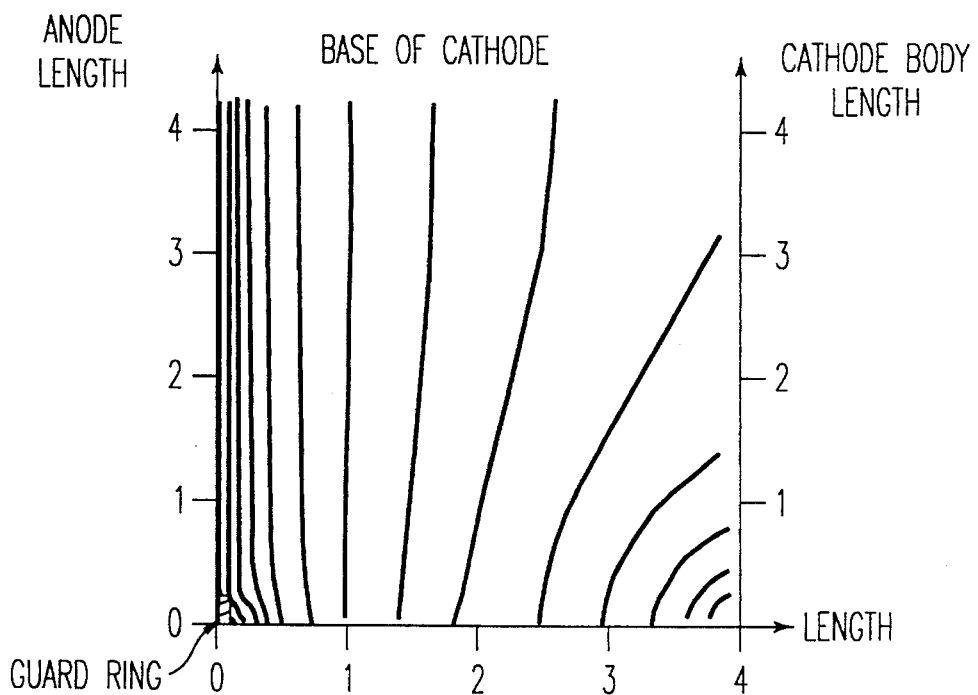

FIG. 3 the two-dimensional electrical field distribution for the same counter as in FIG. 2.

Figure 4:
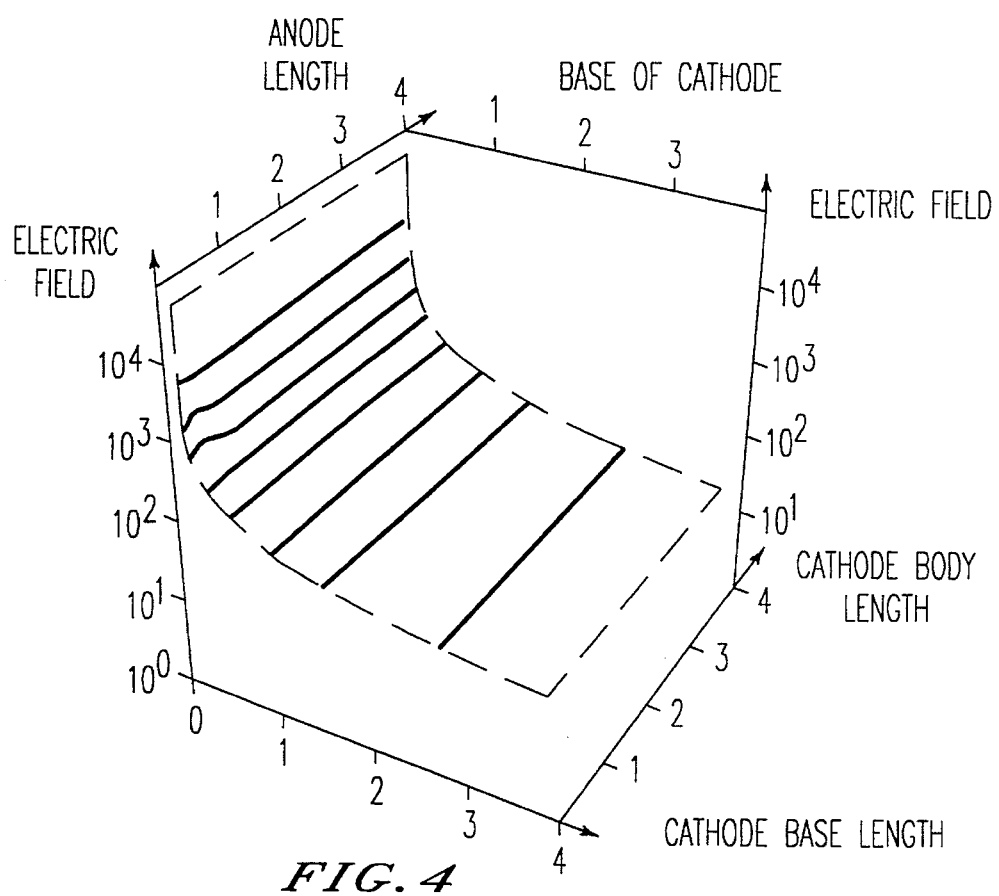
Figure 5:
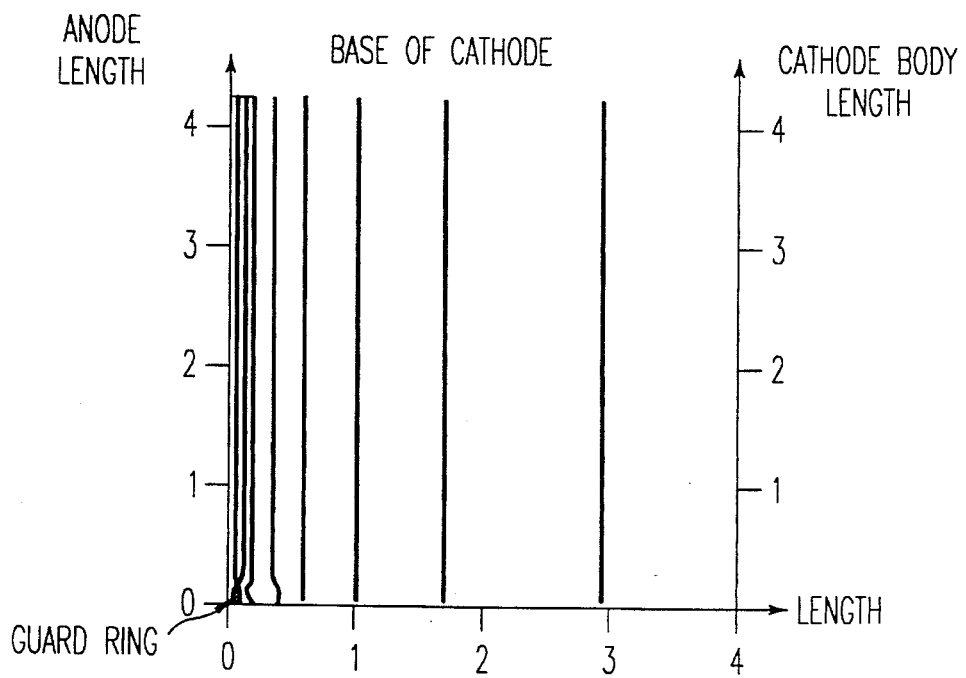

FIGS. 4 and 5 respectively identical to FIGS. 2 and 3, except that part of the biological tissue-equivalent counter cathode is formed from the very high resistivity polymer composition according to the invention.

Figure 6:
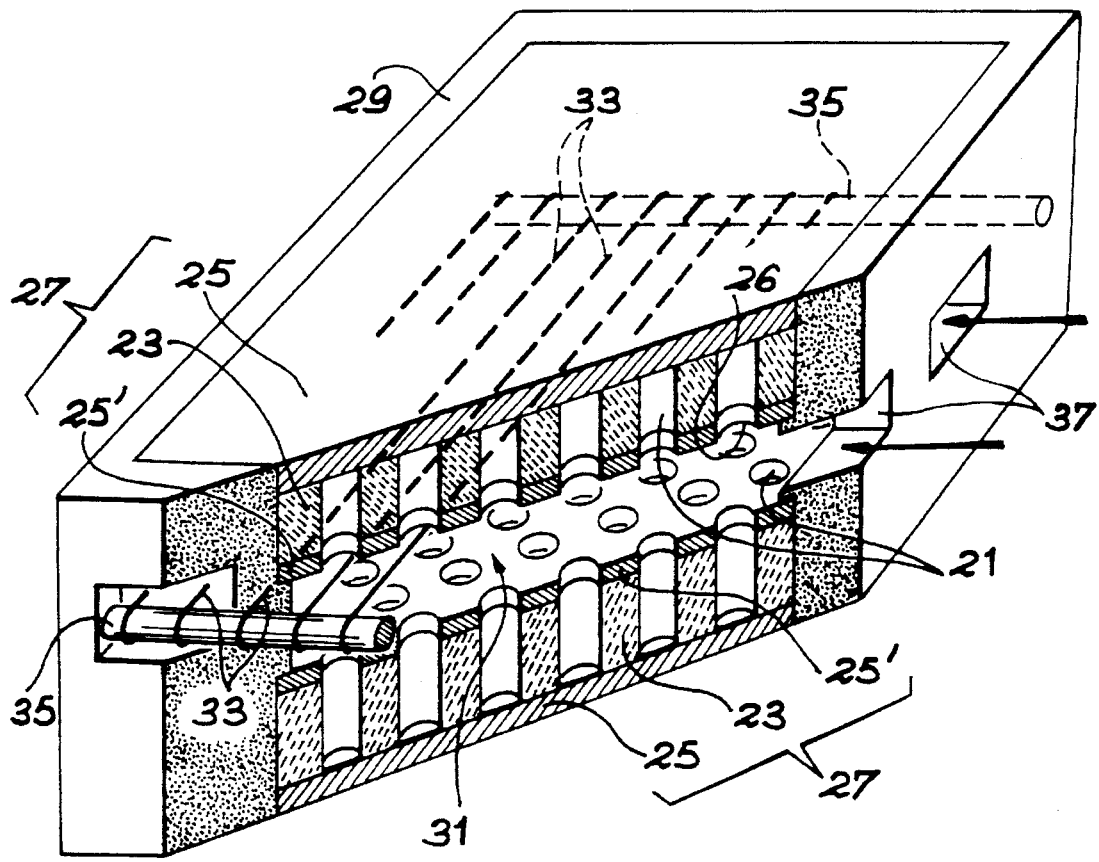

FIG. 6 a diagram illustrating in section and in perspective, a multicellular, biological tissue-equivalent counter.

The biological tissue-equivalent polymer composition according to the invention was prepared from a mixture of polymers and in particular polyamide, polypropylene and epolene. This polymer mixture was also completed by the addition of fillers and conductive fillers, in order to adjust the atomic number in the end product and obtain a product simultaneously respecting the requirements of the ICRU and having a very high resistivity.

The polymer used in said polymer composition is preferably that having the general formula $[-(CH_2)-CO-NH-]_n$. This polyamide is known under the name PA12 VESTAMID L2101 (registered trademark) and is e.g. marketed by Cabot (Netherlands). Its mass atomic composition is as follows:
nitrogen: 7.1%
hydrogen: 11.7%
oxygen: 8.1%
carbon: 73.1%.

As this polyamide is the only one among the polymers used which is constituted by nitrogen, it will determine the concentration of said chemical element in the end product. Therefore in order to respect the nitrogen percentage defined by the ICRU in a biological tissue-equivalent composition (i.e. 3.5%), approximately 49.3% of this polyamide will be used. However, as will be described in greater detail hereinafter, the product used is rarely pure and the presence of impurities in the polyamide can lead to a variation in the polyamide percentage used, in order to respect the mass atomic percentage of the nitrogen in the final composition.

The polypropylene $[-CH_2-CH(CH_3)-]_n$ used is known under the tradename VESTOLEN 8400 and is e.g. marketed by Cabot (Netherlands). This product has a melting point close to that of the aforementioned polyamide, which facilitates the mixing of these two products.

Use is also made in the polymer composition of epolene, which is polypropylene mixed with approximately 1% carboxylic acid. Epolene makes it possible to avoid a separation of the phases between two immiscible polymers such as polypropylene and polyamide, as defined hereinbefore.

In addition, to this mixture of three polymers is added a filler, whose function is to adjust the atomic number of the end product to that of the tissue defined by ICRU, said condition being important for obtaining equivalence of the biological tissue with respect to photons. This filler can e.g. be chosen among calcium fluoride $CaF_2$ or calcium carbonate $CaCO_3$.

Finally, in order to obtain a conductive polymer, it is appropriate to add a conductive filler to this mixture. This conductive filler is preferably carbon black. In the various tests performed, said carbon black was added either in the form of a free powder introduced into the polymer mixture, or replaced by polypropylene directly introduced into the carbon black.

Thus, ten different polymer compositions were produced by varying the percentages of the different constituents mentioned hereinbefore. The exact compositions are given in the following table 1.

During different tests, it was found that the epolene made it possible to bring about a better homogenization of the product. Among the ten compositions produced, those containing carbon black in powder form were much more homogeneous than compositions based on carbon black-filled polypropylene. This difference is probably due to the fact that the filler constituted by calcium fluoride or calcium carbonate mixes better with carbon black in the first case than in the second.

In addition, the resistivity of these different compositions was tested. The resistivity measurement was performed in accordance with standard NFTS1-189, which relates to the measurement of the resistivity of conductive plastics material. This measurement is based on the principle consisting of passing a stable direct current of intensity I between the two ends of a small sample plate formed in the material to be analysed. By means of a potentiometer, a measurement takes place of the voltage drop $\Delta U$ between the two electrodes placed at the two ends of the sample plate. The resistance R of the tested sample proportion placed between the two contact electrodes is given by the formula $R=U/I$. This resistance is independent of the resistance of the measuring electrodes.

For each of the ten aforementioned compositions, use was made of a 10 mm wide, 70 to 150 mm long and 3 to 4 mm thick sample plate with a thickness uniformity tolerance of 5%. Following preparation, each sample plate was left at ambient temperature and under ambient humidity conditions for at least 16 hours. For each test, three plates having the same dimensions were prepared in each of the perpendicular directions (longitudinal and traverse). These three plates then underwent the resistivity measurement test.

The calculation of the resistivity $\rho$ is given by the formula $\rho=(R \times A)/d$, in which R represents the resistance of the plate (expressed in Ohms), A is the area of the cross-section of the plate (expressed in $cm^2$) and d the distance between the two measuring electrodes (expressed in cm). The results are given in the following table 1.

TABLE 1

| Sample plate Number | Chemical composition of polymer composition | Resistance (Ohms) | Resistivity (Ohms · cm) |
| --- | --- | --- | --- |
| | | $1.1 \cdot 10^{12}$ | $3.3 \cdot 10^{10}$ |

TABLE 1-continued

| Sample plate Number | Chemical composition of polymer composition | Resistance (Ohms) | Resistivity (Ohms · cm) |
|---|---|---|---|
| 1 | Pa12: 49.3% | $1.1 \cdot 10^{12}$ | $3.3 \cdot 10^{10}$ |
| | PP: 29.98% | $1.1 \cdot 10^{12}$ | $3.3 \cdot 10^{10}$ |
| | EPO: 1% | $1.1 \cdot 10^{12}$ | $3.3 \cdot 10^{10}$ |
| | NC: 19.72% | $1.1 \cdot 10^{12}$ | $3.3 \cdot 10^{10}$ |
| | | $1.3 \cdot 10^{12}$ | $3.9 \cdot 10^{10}$ |
| 2 | PA12: 49.3% | $1.3 \cdot 10^{12}$ | $3.9 \cdot 10^{10}$ |
| | PP: 30.98% | $1.3 \cdot 10^{12}$ | $3.9 \cdot 10^{10}$ |
| | EPO: 1% | $1.3 \cdot 10^{12}$ | $3.9 \cdot 10^{10}$ |
| | NC: 5% | $1.3 \cdot 10^{12}$ | $3.9 \cdot 10^{10}$ |
| | CaF$_2$: 13.72% | $1.3 \cdot 10^{12}$ | $3.9 \cdot 10^{10}$ |
| | | $1.3 \cdot 10^{12}$ | $3.9 \cdot 10^{10}$ |
| 3 | PA12: 49.3% | $1.3 \cdot 10^{12}$ | $3.9 \cdot 10^{10}$ |
| | PP: 30.98% | $1.3 \cdot 10^{12}$ | $3.9 \cdot 10^{10}$ |
| | EPO: 1% | $1.3 \cdot 10^{12}$ | $3.9 \cdot 10^{10}$ |
| | NC: 8% | $1.3 \cdot 10^{12}$ | $3.9 \cdot 10^{10}$ |
| | CaF$_2$: 10.72% | $1.3 \cdot 10^{12}$ | $3.9 \cdot 10^{10}$ |
| | | $1.3 \cdot 10^{12}$ | $3.9 \cdot 10^{10}$ |
| 4 | PA12: 49.3% | $1.3 \cdot 10^{12}$ | $3.9 \cdot 10^{10}$ |
| | PP: 30.98% | $1.3 \cdot 10^{12}$ | $3.9 \cdot 10^{10}$ |
| | EPO: 1% | $1.3 \cdot 10^{12}$ | $3.9 \cdot 10^{10}$ |
| | NC: 10% | $1.3 \cdot 10^{12}$ | $3.9 \cdot 10^{10}$ |
| | CaF$_2$: 8.72% | $1.3 \cdot 10^{12}$ | $3.9 \cdot 10^{10}$ |
| | | $60 \cdot 10^9$ | $1.8 \cdot 10^9$ |
| 5 | PA12: 51.62% | $20 \cdot 10^9$ | $6 \cdot 10^8$ |
| | PPNC1: 32.61% | $40 \cdot 10^9$ | $1.2 \cdot 10^9$ |
| | EPO: 1% | $150 \cdot 10^9$ | $4.5 \cdot 10^9$ |
| | CaF$_2$: 14.77% | $80 \cdot 10^9$ | $2.4 \cdot 10^{10}$ |
| | | $130 \cdot 10^9$ | $3.9 \cdot 10^9$ |
| | | $100 \cdot 10^9$ | $3 \cdot 10^9$ |
| 6 | PA12: 51.62% | $50 \cdot 10^9$ | $1.5 \cdot 10^9$ |
| | PPNC1: 32.61% | $130 \cdot 10^9$ | $3.9 \cdot 10^9$ |
| | EPO: 1% | $70 \cdot 10^9$ | $2.1 \cdot 10^9$ |
| | CaCO$_3$: 14.77% | $90 \cdot 10^9$ | $2.7 \cdot 10^9$ |
| | | $100 \cdot 10^9$ | $3 \cdot 10^9$ |
| | | $65 \cdot 10^9$ | $1.95 \cdot 10^9$ |
| 7 | PA12: 51.62% | $85 \cdot 10^9$ | $2.55 \cdot 10^9$ |
| | PPNC2: 30.59% | $55 \cdot 10^9$ | $1.65 \cdot 10^9$ |
| | EPO: 1% | $80 \cdot 10^9$ | $2.4 \cdot 10^9$ |
| | CaF$_2$: 16.79% | $35 \cdot 10^9$ | $1.05 \cdot 10^9$ |
| | | $45 \cdot 10^9$ | $1.35 \cdot 10^9$ |
| | | $110 \cdot 10^9$ | $3.3 \cdot 10^9$ |
| 8 | PA12: 51.62% | $40 \cdot 10^9$ | $1.2 \cdot 10^9$ |
| | PPNC2: 30.59% | $80 \cdot 10^9$ | $2.4 \cdot 10^9$ |
| | EPO: 1% | $120 \cdot 10^9$ | $3.6 \cdot 10^9$ |
| | CaCO$_3$: 16.79% | $135 \cdot 10^9$ | $4.05 \cdot 10^9$ |
| | | $70 \cdot 10^9$ | $2.1 \cdot 10^9$ |
| | | $20 \cdot 10^9$ | $6 \cdot 10^8$ |
| 9 | PA12: 52.52% | $40 \cdot 10^9$ | $1.2 \cdot 10^8$ |
| | PPNC1: 32.44% | $5 \cdot 10^9$ | $1.5 \cdot 10^8$ |
| | EPO: 1% | $25 \cdot 10^9$ | $7.5 \cdot 10^8$ |
| | CaF$_2$: 14.64% | $10 \cdot 10^9$ | $3 \cdot 10^8$ |
| | | $50 \cdot 10^9$ | $1.5 \cdot 10^8$ |
| | | $10 \cdot 10^9$ | $3 \cdot 10^8$ |
| 10 | PA12: 52.52% | $20 \cdot 10^9$ | $6 \cdot 10^8$ |
| | PPNC2: 28.46% | $15 \cdot 10^9$ | $4.5 \cdot 10^8$ |
| | EPO: 1% | $20 \cdot 10^9$ | $6 \cdot 10^8$ |
| | CaF$_2$: 18.02% | $25 \cdot 10^9$ | $7.5 \cdot 10^8$ |
| | | $10 \cdot 10^9$ | $3 \cdot 10^8$ |

PA12: polyamide 12
EPO: epolene
PP: polypropylene (85.72% C, 14.28% H)
NC: carbon black
PPNC1 or PPNC2: carbon black-filled polypropylene (PPNC1: 87.38%, 12.14% H and PPNC2: 86.02% C, 13.78% H).

The best resistivity results are obtained with samples 1 to 4. These samples contain carbon black in the form of free powder and not directly included in the polypropylene. These results are also relatively homogeneous.

With regards to samples 5 to 10, it can be seen that the resistivity values are much lower and in particular that they are not homogeneous. This is explained by the fact that it is easier to mix three separate products as is the case for tests 1 to 4 than firstly two products (i.e. polypropylene and carbon black) followed by the grafting thereto of a third product (PA12), as is the case in tests 5 to 10.

Samples 1 to 4 then underwent chemical analyses, in order to obtain their mass atomic composition.

Sample 2 was retained as best complying with the objectives of the invention with regards the atomic composition and resistivity. Sample 2 has the following mass atomic composition:
hydrogen: 10.3%
carbon: 71%
nitrogen: 3.5%
oxygen: 4.5%
calcium: 5.5%
fluorine: 5.2%.

The resistivity of this polymer composition is approximately 5G Ohms•cm and its melting point is between 150° and 180° C.

However, samples 3 and 4 are also of interest. Consequently it is possible to define the polymer composition in more general terms by the following atomic composition ranges:
hydrogen: 6 to 14% or preferably 8 to 12%,
carbon: 55.5 to 86.5% or preferably 63.5 to 78.5%,
nitrogen: 2.5 to 4.5% or preferably 3 to 4%,
oxygen: 1.5 to 7.5% or preferably 3 to 6%,
calcium: 1.5 to 9.5% or preferably 3.5 to 7.5%,
fluorine: 1 to 9% or preferably 3 to 7%.

It will also be ensured that the sum of the carbon, oxygen and fluorine quantities in the total atomic composition is in the first case between approximately 76.5 and 85.5% and in the second between 72 and 90%.

The polymer compositions entering the value ranges comply in a satisfactory manner with the requirements of the ICRU and have a high resistivity of approximately 10M Ohms•cm to 40G Ohms•cm.

During the production of the resistive polymer, it is found that the polypropylenes and polyamides mix badly. Therefore the polymers obtained are not homogeneous. By adding epolene it is possible to avoid the separation of the phases between the two immiscible polymers (polypropylene and polyamide), so that the product obtained at the end of production is homogeneous. However, the homogeneity of the mixture is never perfect and never identical between one production batch and the next. The atomic composition of material losses throughout the production process can consequently not be quantified and there is no precise theoretical correspondence between the mass atomic percentages of the final composition of the polymer and the percentages of the different products used for producing the same. In the same way, the constituents of the polymer have impurities, which are not taken into account in the chemical formulas of the different constituents, so that the calculations making it possible to determine the weights of the constituents are subject to errors, which are empirically corrected during production, with a view to obtaining the desired mass atomic composition.

The composition of the biological tissue-equivalent polymers according to the invention can be used in the production of certain parts of a biological tissue-equivalent proportional counter, which is either of the monocellular or multicellular type.

One example of a monocellular, biological tissue-equivalent proportional counter is illustrated in FIG. 1. This counter is intended to simulate a biological tissue volume of a few micrometers. This counter comprises an enclosure 1, defined by a cylindrical sheath 3, but which could also be given a different shape. This sheath 3 serves as a cathode. In addition, an anode 5 is positioned along the longitudinal axis of the cylindrical sheath 3. The anode 5 is made from a conductive, biological tissue-equivalent material. The cathode 3 is in two parts, namely a cylindrical body 3' and two bases 3" placed at the two ends of the cathode 3. The anode 5 is electrically insulated from the base 3" of the cathode by an insulator 7 and a guard ring 9. The function of the guard ring 9 is to collect static electric charges before they reach the anode 5, where they might induce interfering electric pulses. Finally, the enclosure 1 is filled with a gaseous mixture 11, which must also have a biological tissue-equivalent composition. The cathode 3 is connected to earth, whilst the anode 5 is connected to amplification means 13 for the electrical signal supplied by said anode.

The operation of the counter will now briefly be described. When said counter is exposed to a mixed radiation field comprising photons and neutrons, the latter interact with the gas 11 and the cathode 3, giving rise to charged particles (recoil nuclei and electrons). Part of the charged particles, created at the cathode 3,3',3", traverses the gas 11.

The phenomena used for detection are ionization and excitation of the gas 11. The interaction of a charged particle with the atoms of gas locally produces a certain number of ion pairs which, in the absence of an electric field (i.e. if the potential applied to the anode is the same as that applied to the cathode) recombine. Moreover, if the gas 11 is placed in an electric field (i.e. if the potential applied to the anode 5 exceeds that applied to the cathode 3), the positive ions formed migrate towards the cathode 3,3',3", whereas the electrons migrate towards the anode 5 traversing an area where the electric field is increasingly intense. During its displacement the electron is accelerated and can then ionize and excite the atoms of the gas 11. The thus created electrons are in turn accelerated. A Townsend avalanche occurs around the anode 5. The interaction of a particle with the counter leads to an electric pulse which is collected at the terminals of the counter and whose amplitude is proportional to the collected number of electrons.

The interaction of the charged particles with the gas 11 can occur at any random location throughout the gas volume. However, it is necessary for the variation of the electric field within the enclosure to be as homogeneous as possible. This can be achieved by using the polymer composition according to the invention for producing the cathode 3 or more specifically for producing part of it.

Calculations have been made using a cylindrical, monocellular, biological tissue-equivalent counter, whose bases 3" were produced from a conductive, biological tissue-equivalent material of type A150 (registered trademark), namely the high resistivity biological tissue-equivalent polymer composition according to the invention.

In order to reveal the interest of the material change in the biological tissue-equivalent counter, the distribution of the electric field within said counter was measured in two cases.

The results illustrated in FIGS. 2 and 3 correspond to those obtained when the bases 3" of the cathode 3 are made from the prior art, conductive, biological tissue-equivalent material.

FIG. 2 corresponds to the electric field lines in three dimensions and FIG. 3 in two dimensions. The calculations were performed when the potentials were respectively OV at the cathode 3',3", 600V at the anode 5 and 300V at the guard ring 9.

There is a deformation of the electric field at the approaches of the bases 3" of the cylinder, which has the effect of reducing the resolving power of the apparatus.

However, and as illustrated in the attached FIGS. 4 and 5 (measurements performed under identical conditions), it can be seen that the use of the polymer composition according to the invention avoids this deformation of the electric field.

The use of the novel polymer composition according to the invention in the production of a multicellular, biological tissue-equivalent counter will now be described relative to FIG. 6. The operation of this counter is identical to that described hereinbefore for the monocellular counter.

Each cell 21 of the multicellular counter is a cylindrical channel hollowed into a high resistivity, biological tissue-equivalent polymer material block 23 according to the invention. Thus, several cells are provided, which are arranged in the form of parallel rows. The block 23 is maintained in sandwich form between two plates 25,25' of a conductive, biological tissue-equivalent material. The plates 25' directed towards the interior of the counter are perforated by orifices 26 in the extension of the cells 21. Such an assembly being designated 27. Two assemblies 27 are superimposed and assembled in a frame 29, so as to define an enclosure 31 between them. The frame 29 is preferably made from polyethylene.

The anodes are constituted by wires 33 stretched in the enclosure 31 equidistantly between the two assemblies 27. Each anode is stretched in front of a row of cells 21, so as to be at the diameter thereof. The anode wires 33 are maintained at the two ends of the frame 29 by an anode support 35.

In addition, there are several inlets 37 on at least one lateral face of the frame 29 to permit the filling of the enclosure 31 and the cells 21 by a biological tissue-equivalent gas.

The polymer composition according to the invention used for forming the block 23 makes it possible to create an electric field parallel to the longitudinal axis of the cell 21, which would not have been possible with a conductive, biological tissue-equivalent material.

The electric field within the cells 21 makes it possible to avoid the recombination of the electric charges (ions and electrons) created in the volume of the counter during irradiation. This result is obtained by using the polymer according to the invention (resistivity a few GΩ•cm). The ends of each cell 21 are raised to the potentials of V1 and V2 (V2>V1) with the aid of two plates 25 (the upper plate 25 in FIG. 6 being raised to a potential V1 and the lower plate 25' to a potential V2).

The high resistivity of the polymer makes it possible to limit the electric current passing through it and therefore reduce the heat dissipation and the power consumption of the counter.

We claim:

1. Biological tissue-equivalent polymer composition with a high resistivity, which is formed from a polyamide, polypropylene, polypropylene mixed with approximately 1% carboxylic acid, fillers and carbon black and which has a mass atomic composition such that the hydrogen is between approximately 6 and 14%, the carbon between approximately 55.5 and 86.5% the nitrogen between approximately 2.5 and 4.5%, the oxygen between approximately 1.5 and 7.5%, the calcium between approximately 1.5 and 9.5% and the fluorine between approximately 1 and 9%, the sum of the quantities of carbon, oxygen and fluorine in the total atomic composition being between approximately 72 and 90%.

2. Polymer composition according to claim 1, wherein its mass atomic composition is such that the hydrogen is between approximately 8 and 12%, the carbon between approximately 63.5 and 78.5%, the nitrogen between approximately 3 and 4%, the oxygen between approximately 3 and 6%, the calcium between 3.5 and 7.5% and the fluorine between 3 and 7%, the sum of the carbon, oxgyen and fluorine quantities in the total composition being between approximately 76.5 and 85.5%.

3. Polymer composition according to claim 2, wherein its mass atomic composition is approximately 10.3% hydrogen, 71% carbon, 3.5% nitrogen, 4.5% oxygen, 5.5% calcium and 5.2% fluorine.

4. Polymer composition according to claim 1, wherein said the carbon black is in the form of a free powder.

5. Polymer composition according to claim 1, wherein its resistivity is between 10M Ohms·cm and 40G Ohms·cm.

6. Polymer composition according to claim 1, wherein the monomeric unit of the polyamide is of the formula (—$CH_2$—CO—NH—).

7. Polymer composition according to claim 1, wherein the monomeric unit of the polypropylene is of the formula (—$CH_3$—CH($CH_3$)—).

8. Polymer composition according to claim 1, wherein said filler is calcium fluoride.

9. A monocellular, biological tissue-equivalent proportional counter comprising a sealed enclosure, defined by a cathode having an elongated body and two bases sealing the two ends of said body, the enclosure being filled with a biological tissue-equivalent gas and being longitudinally traversed by an amode, wherein said two bases are made of a polymer composition according to claim 1.

10. A multicellular, biological tissue-equivalent proportional counter comprising a sealed enclosure, defined by a frame and at least two assemblies, each assembly being formed from a block located between two conductive plates, the plate directed towards the interior of said enclosure and the block being perforated so as to define a plurality of cells issuing into the enclosure, said enclosure being filled with a biological tissue-equivalent gas and traversed by at least one anode, wherein said block is made from a polymer composition according to claim 1.

11. A method of producing a biological tissue-equivalent proportional counter having a cathode, comprising forming at least part of the cathode from the polymer composition of claim 1.

* * * * *